United States Patent

Ban

[11] Patent Number: 5,818,523
[45] Date of Patent: Oct. 6, 1998

[54] METHOD OF CORRECTING WHITE SHADING FOR VIDEO CAMERAS AND APPARATUS ADOPTING THE SAME

[75] Inventor: Young-gyun Ban, Suwon, Rep. of Korea

[73] Assignee: Samsung Electronics Co., Ltd., Kyungki-do, Rep. of Korea

[21] Appl. No.: 602,381

[22] Filed: Feb. 16, 1996

[30] Foreign Application Priority Data

Feb. 16, 1995 [KR] Rep. of Korea ............... 1995-2953

[51] Int. Cl.$^6$ ....................................... H04N 9/73
[52] U.S. Cl. .................. 348/224; 348/251; 348/347
[58] Field of Search .................. 348/223, 224, 348/228, 250, 251, 347, 241, 181, 175; 358/461; 382/274

[56] References Cited

U.S. PATENT DOCUMENTS

| | | | |
|---|---|---|---|
| 4,878,128 | 10/1989 | Yasumura et al. | 358/315 |
| 4,908,874 | 3/1990 | Gabriel | 382/41 |
| 5,047,861 | 9/1991 | Houchin et al. | 358/213.15 |
| 5,157,497 | 10/1992 | Topper et al. | 358/209 |
| 5,644,409 | 7/1997 | Irie et al. | 358/461 |

*Primary Examiner*—Andrew I. Faile
*Assistant Examiner*—Jacqueline Wilson
*Attorney, Agent, or Firm*—Sughrue, Mion, Zinn, Macpeak & Seas, PLLC

[57] ABSTRACT

White shading of an image signal is corrected by a white shading correction system which requires a small amount of memory. Rather than storing correction signals for an entire image frame for each possible condition of zoom lens position and iris opening degree, the present system stores correction signals for a single frame corresponding to a single condition where the zoom lens is at a medium position and the iris is at a medium opening degree. The present system also generates a set of correction factors corresponding to each possible condition of zoom lens position and iris opening degree. When the conditions of zoom lens position and iris opening change from their medium values, the correction signals used for correcting the image data picked up by the camera are modified by the appropriate correcting factor prior to performing correction of the picked-up image data. Additionally, memory space is conserved by decimating the correction signals before storing them in memory and interpolating between the decimated correction signal before using them to perform corrections.

18 Claims, 5 Drawing Sheets

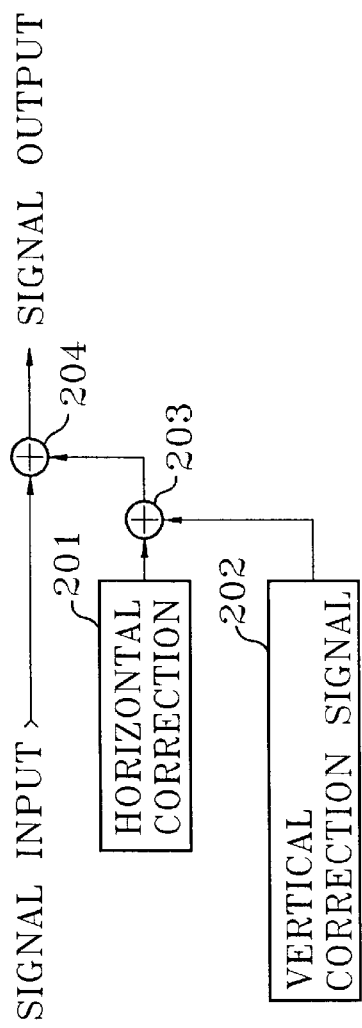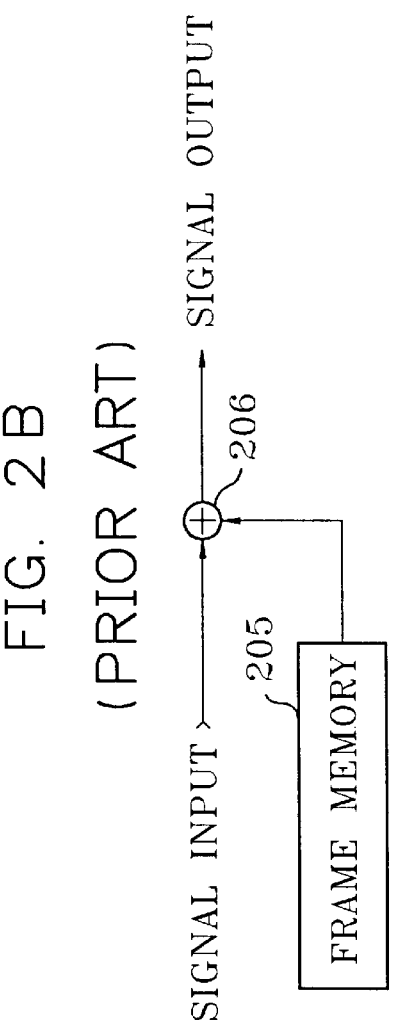

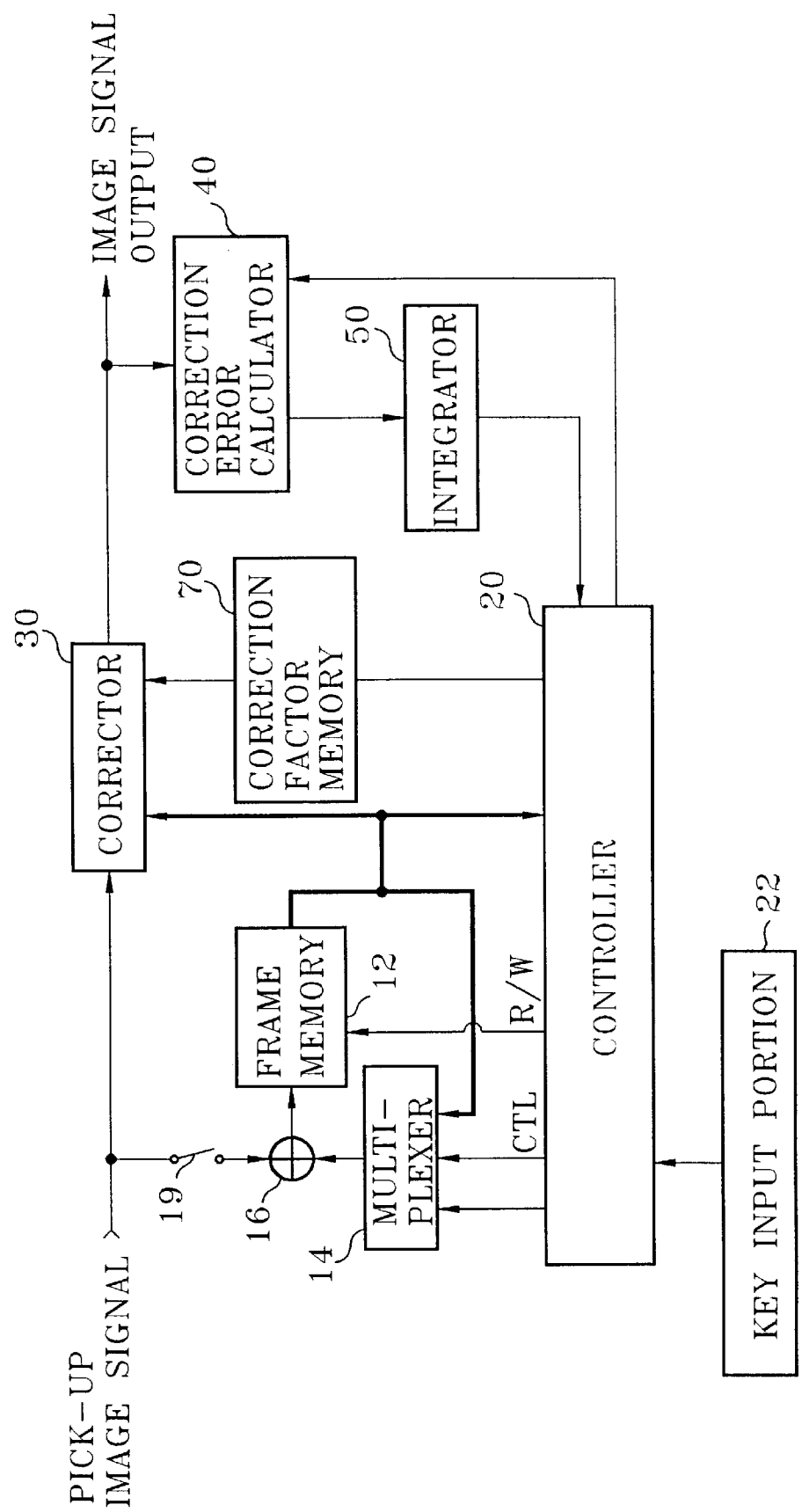

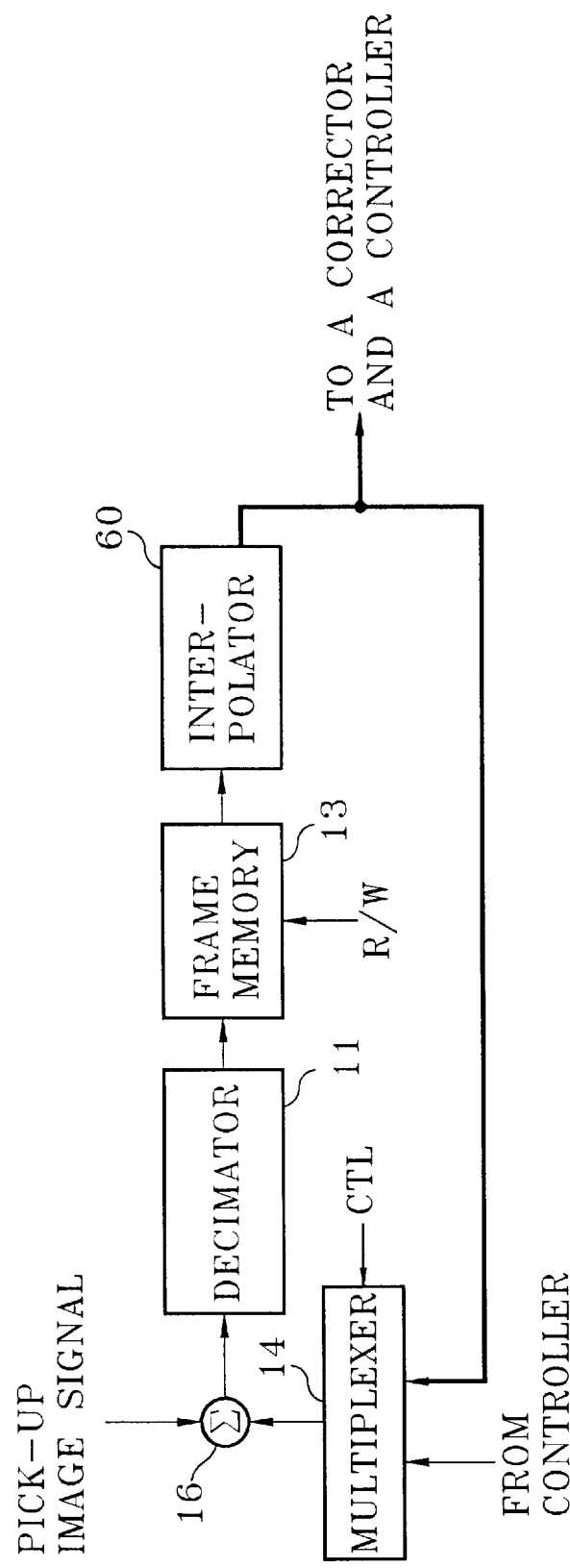

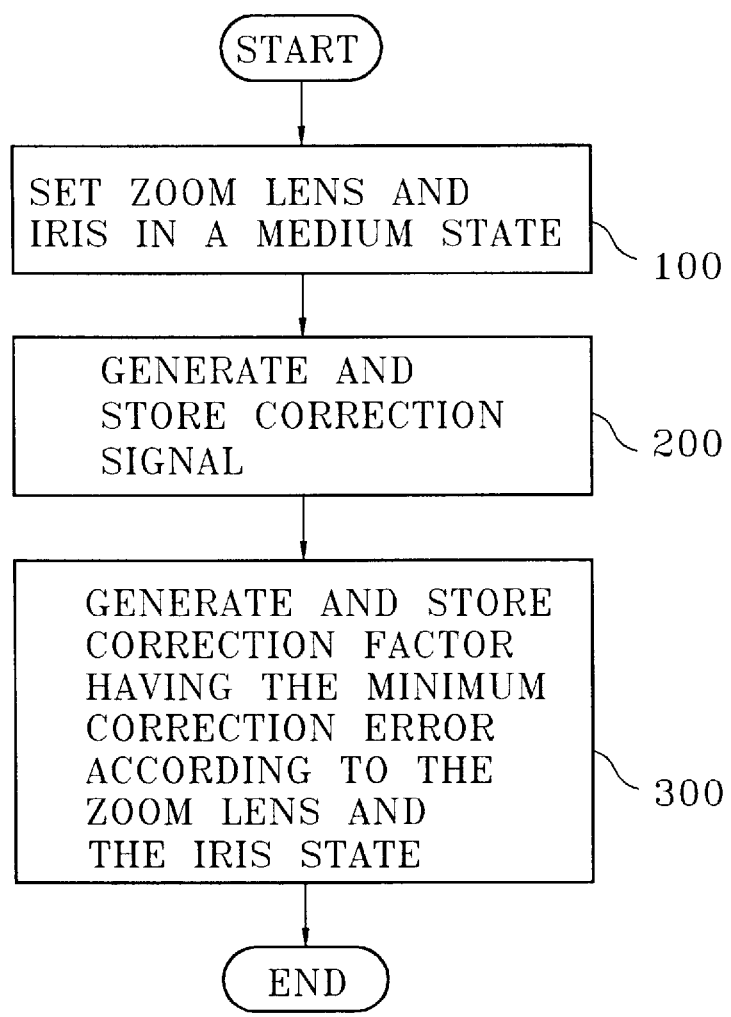

METHOD OF CORRECTING WHITE SHADING FOR VIDEO CAMERAS AND APPARATUS ADOPTING THE SAME

BACKGROUND OF THE INVENTION

The present invention relates to a camera, and particularly to a method of correcting white shading of a signal picked up by a video camera and an apparatus adopting the same.

In a TV camera or a video camera having dichromic mirrors or a dichromic prism, the center portion of an image meets a white balance according to the light at the center of an optical image. However, the light in the upper or lower portion of the optical image is incident to a pickup tube, such as a charge-coupled device, in a slightly different angle compared with that of the center light, to thereby cause mismatch of the white balance. Such a phenomenon is called white shading and varies in its characteristic according to an opening state of an iris and a zooming state of a lens. In the case when an iris is in the opening state and a zoom lens is in the state of a wide angle, an amount of the white shading becomes large.

A conventional apparatus for correcting white shading by an analog method will be described below with reference to FIG. 2A.

The FIG. 2A apparatus includes a horizontal correction signal generator 201 and a vertical correction signal generator 202 for generating a sawtooth wave or a parabolic wave, respectively. The correction signals generated by both correction signal generators 201 and 202 are added by an adder 203. The added signal from the adder 203 is again added to an input electrical image signal in an adder 204. As a result, white shading is corrected in the obtained image signal.

However, since the above method uses a sawtooth wave or a parabolic wave in a fixed form of correcting the white shading, an accurate correction cannot be obtained.

Another prior art technology of correcting white shading will be described below with reference to FIGS. 1 and 2B.

In FIG. 1, showing a structure of a general camera system, an amount of the light input via a lens 1 is adjusted by an amount of opening and closing of an iris 2. The input light of which the light-amount has been adjusted is converted into an electrical signal in a charge-coupled device 3. The electrical signal is converted into a digital signal in an analog-to-digital (A/D) converter 4. Meanwhile, zoom state information of lens 1 and information on the opening state of iris 2 is applied to a controller 6. The controller 6 controls a corrector 5 based on the input information. The output image signal of the A/D converter 4 is processed in corrector 5, to attain white shading correction. The corrected image signal is converted back into an analog signal in a digital-to-analog (D/A) converter 7 and then the analog signal is supplied to a monitor (not shown).

In the corrector 5 constructed as shown in FIG. 2B, a frame memory 205 outputs a correction signal of an address which is designated by the input information representing the opening state of the iris and the zooming state of the lens. The correction signal is added to the input electrical signal in adder 206. In this method, as possible pickup conditions of the iris and the zoom lens increase, it raises a problem to increase a memory capacity which is needed for storing the correction signals.

SUMMARY OF THE INVENTION

Therefore, to solve the above problem it is an object of the present invention to provide a method for correcting white shading so as to be adapted to all possible pickup conditions due to the opening state of an iris and the zooming state of a zoom lens while requiring only a small memory capacity.

Another object of the present invention is to provide an apparatus embodying the above white shading correction method.

To accomplish an object of the present invention, there is provided a method for correcting white shading of an image signal picked up by a camera, the white shading correction method comprising the steps of:

(a) storing a correction reference value and a plurality of correction signals based on a picked-up reference scene having a uniform illuminance at a pickup condition having a predetermined position of a zoom lens and a predetermined opening degree of an iris;

(b) calculating correction factors for respectively possible pickup conditions due to the position of the zoom lens and the opening degree of the iris by using a currently picked-up image signal, the correction reference value and the plurality of the correction signals;

(c) individually storing the correction factors calculated in step (b) in correspondence to the pickup conditions; and (d) correcting white shading of the currently picked-up image signal by using the plurality of the correction signals and a correction factor corresponding to a current pickup condition.

Another object of the present invention can be accomplished by providing an apparatus for correcting white shading of an image signal picked up by a camera, the white shading correction apparatus comprising:

memory means for storing a plurality of correction signals for individual image signals constituting an image frame;

correction factor memory means for storing correction factors for respectively possible pickup conditions due to a position of a zoom lens and an opening degree of an iris;

control means for controlling the memory means and the correction factor memory means so as to provide respectively a correction factor corresponding to a current pickup condition and the correction signals corresponding to a picked-up individual image signal; and correction means for receiving the plurality of the correction signals from the memory means and the correction factor from the correction factor memory means and correcting white shading of the picked-up individual image signal by using the received data.

Preferably, the above apparatus for correcting the white shading of the image signal which is picked up in the camera is incorporated in the camera.

BRIEF DESCRIPTION OF THE DRAWINGS

The preferred embodiments are described with reference to the drawings wherein:

FIGS. 2A and 2B are block diagrams for explaining conventional white shading correction methods, respectively.

FIG. 3 is a block diagram of a white shading correction apparatus according to a preferred embodiment of the present invention.

FIG. 4 is a block diagram of a white shading correction apparatus according to another preferred embodiment of the present invention.

FIG. 5 is a flowchart diagram for explaining determination of a correction signal and a correction factor according to the present invention.

DETAILED DESCRIPTION OF THE PREFERRED EMBODIMENTS

Figure 1:
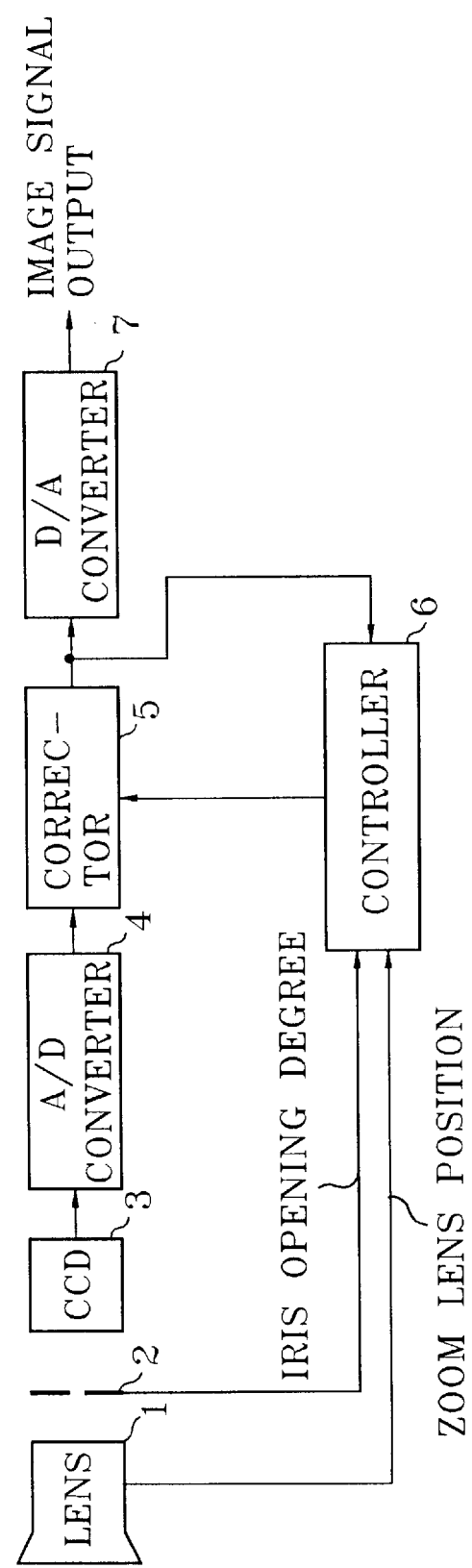
FIG. 1 is a block diagram showing a general camera.

Preferred embodiments of the present invention will be described below in more detail with reference to the accompanying drawings FIGS. 3 through 5.

The FIG. 3 apparatus according to a preferred embodiment of the present invention is for correcting white shading of a general TV camera having the same zoom lens and the same iris as those shown in FIG. 1, and is preferably incorporated in the TV camera. In FIG. 3, a frame memory 12 stores a plurality of correction signals for correcting white shading of individual image signals constituting one frame. A correction factor memory 70 stores optimum correction factors for respective pickup conditions. The pickup condition is determined by a zoom lens position and an iris opening degree. A controller 20 controls frame memory 12 and correction factor memory 70, so that a correction factor corresponding to a current pickup condition stored in correction factor memory 70 and the correction signals stored in frame memory 12 are supplied to a corrector 30, respectively. The corrector 30 uses the correction signal supplied from frame memory 12 and the correction factor supplied from correction factor memory 70 and performs a white shading correction with respect to an individual image signal obtained by a pickup operation.

FIG. 5 is a flowchart diagram for simply explaining generation of correction signals and correction factors by the FIG. 3 apparatus. The FIG. 3 apparatus performs a step 100 to set a zoom lens position and an iris opening state at a medium level. By performing a step 200, a correction signal for an individual image signal is generated and stored. Then, by performing a step 300, an optimum correction factor for each pickup condition is determined and stored based on the generated correction signal, a correction reference value used for generation of the correction signal, a predetermined correction factor and alteration of the correction factor.

The FIG. 3 apparatus further includes a multiplexer 14, an adder 16 and a switch 19 for generation of the correction signals stored in frame memory 12. The switch 19 is on-and-off controlled by controller 20 in response to a key input portion 22 which inputs a user instruction. The picked-up image signal is input to adder 16 via switch 19. The multiplexer 14 selectively supplies to adder 16 one of either the output signal of controller 20 or the signal from frame memory 12. Selection by multiplexer 14 is made according to a control signal CTL from controller 20. The adder 16 adds together the signal supplied from multiplexer 14 and the picked-up image signal input via switch 19, and then supplies the added result to frame memory 12. The frame memory 12 reads or writes the signal supplied from adder 16 upon receiving a write command according to a read/write control signal (R/W) of controller 20. The signal output from frame memory 12 upon receiving a read command signal is supplied to multiplexer 14, corrector 30 and controller 20.

The FIG. 3 apparatus further includes a correction error calculator 40 and an integrator 50, in order to generate a correction factor adapted for each pickup condition by using the correction signals stored in frame memory 12. The correction error calculator 40 generates a difference value between the output signal of corrector 30 and the signal supplied from controller 20. The generated difference value is integrated by integrator 50. The integrated difference value is supplied to controller 20 to be used for determination of the optimum correction factor for each pickup condition.

The generation of the correction signals stored in frame memory 12 is firstly described below.

A camera operator uses a TV camera having the FIG. 3 apparatus to pick up a reference scene having a uniform illuminance such as a white target at a predetermined pickup condition. Preferably, at the predetermined pickup condition, a zoom lens in the TV camera is positioned in the middle position of the movement range of the zoom lens, and an iris has a medium opening degree within the opening range of the iris. Then, the camera user presses a corresponding key in a key input portion 22. The controller 20 turns switch 19 on in response to the key press. The picked-up image signal supplied by the turn-on of switch 19 is added to the output signal of multiplexer 14 by adder 16. The added signal is stored in frame memory 12 according to a write control signal (W) of controller 20. The signal stored in frame memory 12 is output to multiplexer 14 according to a read control signal (R) of controller 20, and added to an image signal of the following frame by adder 16. The added result of adder 16 is stored again in frame memory 12 according to write control signal (W) of controller 20. Such an operation is performed over several frames by a new manipulation of key input portion 22 by the camera operator until switch 19 will be turned off. If switch 19 is turned off, accumulation of the individual image signal constituting one frame completed and the accumulated signals corresponding to each individual image signal are stored in frame memory 12. Here, the individual image signal is a block constituting a pixel or a plurality of pixels.

If accumulation is completed of a desired number of frames with respect to the individual image signal upon the turn-off of switch 19, controller 20 generates a read control signal (R) and reads a plurality of the accumulated signals stored in frame memory 12. The controller 20 averages the plurality of the accumulated signals read from frame memory 12 to calculate a correction reference value, and divides the correction reference value by each accumulated signal value to generate a correction signal for an individual image signal. The controller 20 alters a control signal CTL so that the correction signal generated by controller 20 is supplied to adder 16, and generates write control signal (W) so that the output signal of adder 16 is stored in frame memory 12. According to the above control, the correction signals generated in controller 20 are stored in frame memory 12. As a result, each correction signal stored in frame memory 12 is for correcting the white shading of the individual image signal obtained by the pickup, which has a value corresponding to an inverse characteristic of the white shading.

If the plurality of the correction signals based on the reference scene are completely generated and stored, controller 20 uses the correction signal stored in frame memory 12 and corrects the white shading with respect to the currently picked-up individual image signal.

Thus far, a procedure for generating the correction signals based on the pickup of the reference scene and storing the generated correction signals in frame memory 12 has been described. However, preferably, frame memory 12 can be designed so that correction signals with respect to the reference scene are pre-stored therein.

As described above, the plurality of the correction signals stored in frame memory 12 correspond to an ideal case such as a pickup condition according to an iris having a medium opening degree and a zoom lens having a middle position Thus, the optimum white shading correction can only be obtained according to in the above ideal pickup condition.

The present invention uses correction factors adapted for various possible pickup conditions by the zoom lens and the iris to supplement the above method. The correction factors can be generated in the same manner as the following descriptions.

The controller 20 uses a predetermined correction factor, individual image signals by the pickup and a correction reference value to generate the optimum correction factor adapted for each pickup condition. Preferably, the predetermined correction factor is pre-stored in correction factor memory 70. To obtain correction factors for respective pickup conditions different from the pickup conditions which are used for generation of the correction signal, controller 20 places the position of the zoom lens in the state of a wide angle and then places the iris in the fully opened state. Then, controller 20 controls correction factor memory 70 to output a predetermined correction factor stored in correction factor memory 70. The corrector 30 performs white shading with respect to the input individual image signal according to the following equation (1) to generate a corrected signal.

Corrected Signal=Individual Image Signal×[Correction Signal× Correction Factor+(1−Correction Factor)]  (1)

Here, the reason why a term of (1−Correction Factor) is added is for attenuating a level change of the total signal due to a change of the correction factor. The corrected signal of corrector 30 is supplied to correction error calculator 40. The correction error calculator 40 receives the correction reference value output from controller 20 and the corrected signal of corrector 30 and calculates a correction error corresponding to the individual image signal according to the following equation (2).

Correction Error=[Correction Reference Value− Corrected Signal]  (2)

An integrator 50 receives the output signal of correction error calculator 40 and integrates the received signal to output the integrated signal to controller 20. Preferably, integrator 50 integrates the correction errors with respect to an image of at least one frame. The controller 20 stores the integrated signal supplied from integrator 50 and controls correction factor memory 70 to output to corrector 30 a correction factor which is altered from the predetermined correction factor. Generation of a new integrated signal using a new correction factor, new correction signals and a new correction reference value is accomplished with respect to all possible correction factors which are altered from the predetermined correction factor. When a plurality of the integrated signals are generated by using the predetermined correction factor and the altered correction factor with respect to a pickup condition having a zoom lens position of a wide angle state and an iris of an opened state, controller 20 determines a correction factor corresponding to the integrated signal having the smallest size among the plurality of the integrated signals as being the optimum correction factor for that corresponding pickup condition.

To obtain the optimum correction factor with respect to respectively different pickup conditions as well, controller 20 repeats the above-described signal processing procedure with respect to all possible pickup conditions due to the zoom lens position and the iris opening state. Thus, correction factors are determined for all possible pickup conditions from when the zoom lens is in the state of a wide angle to when the zoom lens is in zoom state and when the iris is completely opened to when the iris is nearly closed. Each of the determined correction factors is stored in a corresponding position of correction factor memory 70 having a corresponding pickup condition as an address under control of controller 20.

When determination and storage of the optimum correction factors is completed, controller 20 sequentially controls correction factor memory 70 and frame memory 12 so that the correction factor for each pickup condition and the correction signal corresponding to the individual image signal are output. Particularly, correction factor memory 70 which receives the current pickup condition, that is, an address depending upon the iris opening state and the zoom lens position, outputs the correction factor corresponding to that address to corrector 30.

The frame memory 12 which has been described referring to FIG. 3 requires a large capacity because the number of the stored correction signals is the same as that of the pixels constituting one frame. In the present invention, a modified structure as shown in FIG. 4 reduces the capacity of frame memory 12.

The FIG. 4 apparatus uses a frame memory 13 having a smaller capacity than that of frame memory 12 of FIG. 3. To make use of frame memory 13 efficiently, a decimator 11 and an interpolator 60 are used. Similar to FIG. 3. an adder 16 adds the output signal of multiplexer 14 and a picked up image signal. The decimator 11 decimates the output signal of adder 16 at a predetermined decimation ratio, and supplies the decimated resultant signal to frame memory 13. The interpolator 60 interpolates the output signal of frame memory 13 at the same ratio as that of decimator 11 and supplies the interpolated resultant signal to multiplexer 14, as well as the corrector 30 and the controller 20 of FIG. 3. The FIG. 4 apparatus performs decimation and interpolation in the same manner with respect to the correction signal generated by controller 20 of FIG. 3 as well. Thus, each correction signal stored in frame memory 13 is used for a white shading correction with respect to various pixels constituting a block determined by the decimation ratio. Therefore, the proposed FIG. 4 apparatus can store nearly the same correction signals as those of FIG. 3 in a memory of a relatively smaller capacity.

As described above, the white shading correction apparatus according to the present invention can correct various white shading effects which are generated by the zoom lens position and the iris opening state, even with a smaller memory capacity.

While only certain embodiments of the invention have been specifically described herein, it will apparent that numerous modifications may be made thereto without departing from the spirit and scope of the invention.

What is claimed is:

1. A method for correcting white shading of an image signal picked up by a camera having a zoom lens and an iris, said white shading correction method comprising the steps of:
    (a) storing a correction reference value and a plurality of correction signals based on a picked-up reference scene having a uniform illuminance at a pickup condition corresponding to a predetermined position of the zoom lens and a predetermined opening degree of the iris;
    (b) calculating correction factors for plural possible pickup conditions due to different positions of the zoom lens and different opening degrees of the iris by using a currently picked-up image signal, said correction reference value and said plurality of correction signals;

(c) individually storing the correction factors calculated in step (b) in correspondence to the pickup conditions; and (d) correcting white shading of the currently picked-up image signal by using said plurality of correction signals and one of said correction factors corresponding to a current pickup condition;

wherein said step (b) comprises the steps of:

(b1) correcting a currently picked-up image signal at each possible pickup condition by using an individual one among previously determined correction factor values and said plurality of correction signals and outputting a plurality of resultant corrected signals;

(b2) calculating a difference value between each of said plurality of resultant corrected signals of said step (b1) and said correction reference value;

(b3) accumulating a plurality of difference values obtained in said step (b2) and storing the resultant accumulated difference values; and (b4) determining a correction factor corresponding to the accumulated difference value having the smallest size among the accumulated difference values as an optimum correction factor for a corresponding pickup condition.

2. The method for correcting white shading of an image signal picked up by a camera according to claim 1, wherein said predetermined position of the zoom lens is a middle position in the movement range of the zoom lens, and said predetermined opening degree of the iris is a medium opening degree in the opening range of the iris.

3. The method for correcting white shading of an image signal picked up by a camera according to claim 1, wherein each of said correction signals corresponds to an individual pixel of the picked-up image signal.

4. The method for correcting white shading of an image signal picked up by a camera according to claim 1, wherein each of said correction signals corresponds to a block comprising a plurality of pixels of the picked-up image signal.

5. The method for correcting white shading of an image signal picked up by a camera according to claim 1, wherein said step (a) comprises the steps of:

(a1) picking up a reference scene having a uniform illumination at a pickup condition corresponding to said predetermined zoom lens position and said predetermined iris opening degree; and (a2) generating said correction reference value and said plurality of correction signals by using an image signal of at least one frame according to the pickup of the reference scene in said step (a1).

6. The method for correcting white shading of an image signal picked up by a camera according to claim 5, wherein said step (a2) comprises the steps of:

(a2-1) accumulating individual image signals obtained by the pickup of the reference scene by a predetermined number of frames and storing a plurality of the resultant accumulated image signals;

(a2-2) averaging the plurality of the accumulated image signals stored in step (a2-1) and generating the correction reference value representing the average value; and (a2-3) generating said plurality of the correction signals by using a ratio between each of said plurality of the stored accumulated image signals and said correction reference value.

7. The method of correcting white shading of an image signal picked up by a camera according to claim 6, wherein each of said plurality of correction signals is obtained by dividing said correction reference value by an accumulated image signal value corresponding to that correctional signal.

8. The method for correcting white shading of an image signal picked up by a camera according to claim 1, wherein said step (b1) calculates the corrected signal corresponding to the currently picked-up individual image signal according to the following equation which is expressed by said individual image signal and the corresponding correction signal and correction factor:

$$\text{Corrected Signal} = \text{Individual Image Signal} \times \{\text{Correction signal} \times \text{Correction Factor} + (1 - \text{Correction Factor})\}.$$

9. An apparatus for correcting white shading of an image signal picked up by a camera having a zoom lens and an iris, said white shading correction apparatus comprising:

frame memory storing a plurality of correction signals for individual image signals constituting an image frame;

correction factor memory containing correction factors for plural possible pickup conditions corresponding to different positions of the zoom lens and different degrees of opening of the iris;

controller to control said frame memory to provide a correction factor corresponding to a current pickup condition, and to control said correction factor memory to provide one of said plurality of correction signals corresponding to a picked-up individual image signal; and corrector to correct white shading of the picked-up individual image signal based upon said one of said plurality of correction signals provided from said frame memory and said correction factor provided from said correction factor memory, wherein said corrector calculates a white-shading-corrected signal corresponding to the currently picked-up individual image signal according to the following equation which is expressed by said individual image signal and the corresponding correction signal and correction factor:

$$\text{Corrected Signal} = \text{Individual Image Signal} \times \{\text{Correction Signal} \times \text{Correction Factor} + (1 - \text{Correction Factor})\}.$$

10. The white shading correction apparatus according to claim 9, wherein said each correction signal corresponds to an individual pixel constituting an image frame.

11. The white shading correction apparatus according to claim 9, wherein said each correction signal corresponds to for a block comprising individual pixels constituting an image frame.

12. The white shading correction apparatus according to claim 9, wherein said plurality of correction signals are obtained based on an image signal of at least one frame by picking up a reference scene having a uniform illumination at a pickup condition corresponding to a predetermined zoom lens position and a predetermined opening degree of the iris.

13. The white shading correction apparatus according to claim 9, wherein said controller stores a correction reference value and calculates correction factors for all possible pickup conditions corresponding to different positions of the zoom lens and different opening degrees of the iris by using a currently picked-up image signal, said correction reference value and said plurality of correction signals.

14. The white shading correction apparatus according to claim 13, wherein said correction signal has a value obtained by dividing an individual image signal corresponding to pickup of a reference scene by said correction reference value.

15. The white shading correction apparatus according to claim 13, wherein said correction reference value is an average of values of individual image signals constituting at least one frame due to the pickup of said reference scene.

16. An apparatus for correcting white shading of an image signal picked up by a camera having a zoom lens and an iris, said white shading correction apparatus comprising:

frame memory storing a plurality of correction signals for individual image signals constituting an image frame;

correction factor memory containing correction factors for plural possible pickup conditions corresponding to different positions of the zoom lens and different degrees of opening of the iris;

controller to control said frame memory to provide a correction factor corresponding to a current pickup condition, and to control said correction factor memory to provide one of said plurality of correction signals corresponding to a picked-up individual image signal; and corrector to correct white shading of the picked-up individual image signal based upon said one of said plurality of correction signals provided from said frame memory and said correction factor provided from said correction factor memory, wherein said controller determines a correction factor which corresponds to a minimum difference between a corrected signal output from said corrector at each pickup condition and said correction reference value as an optimum correction factor for that pickup condition.

17. An apparatus for correcting white shading of an image signal picked up by a camera having a zoom lens and an iris, said white shading correction apparatus comprising:

frame memory storing a plurality of correction signals for individual image signals constituting an image frame;

correction factor memory containing correction factors for plural possible pickup conditions corresponding to different positions of the zoom lens and different degrees of opening of the iris;

controller to control said frame memory to provide a correction factor corresponding to a current pickup condition, and to control said correction factor memory to provide one of said plurality of correction signals corresponding to a picked-up individual image signal; and corrector to correct white shading of the picked-up individual image signal based upon said one of said plurality of correction signals provided from said frame memory and said correction factor provided from said correction factor memory, wherein said controller uses said correction factors, said correction reference value, and a white-shading-corrected signal output from said corrector to optimize the correction factor for each pickup condition.

18. The white shading correction apparatus according to claim 9, wherein said white shading apparatus is incorporated in said camera.

* * * * *